United States Patent [19]

Coles et al.

[11] Patent Number: 5,596,332
[45] Date of Patent: Jan. 21, 1997

[54] AIRCRAFT LOCATION AND IDENTIFICATION SYSTEM

[75] Inventors: Robert J. Coles, Bloomingdale; Ronald J. Langietti, Roselle; Dennis D. Vaccaro, Glenview, all of Ill.

[73] Assignee: Northrop Corporation, Los Angeles, Calif.

[21] Appl. No.: 651,447

[22] Filed: May 22, 1996

Related U.S. Application Data

[63] Continuation of Ser. No. 229,701, Apr. 19, 1994, abandoned.

[51] Int. Cl.⁶ .................................................. G01S 3/02
[52] U.S. Cl. ........................ 342/455; 364/461; 364/462
[58] Field of Search ......................... 342/455; 364/461, 364/462

[56] References Cited

U.S. PATENT DOCUMENTS

| | | | |
|---|---|---|---|
| 4,197,538 | 4/1980 | Stocker. | |
| 4,232,313 | 11/1980 | Fleishman | 364/453 |
| 4,835,537 | 5/1989 | Manion. | |
| 4,910,526 | 3/1990 | Donnangelo et al. | 342/455 |
| 5,017,930 | 5/1991 | Stoltz et al. | 342/465 |
| 5,043,903 | 8/1991 | Constant | 364/460 |
| 5,111,400 | 5/1992 | Yoder | 364/424.01 |
| 5,153,836 | 10/1992 | Fraughton et al. | 364/461 |
| 5,157,615 | 10/1992 | Brodegard et al. | 364/461 |
| 5,325,302 | 6/1994 | Izidon et al. | 364/461 |
| 5,515,378 | 5/1996 | Roy, III et al. | 370/95.1 |

Primary Examiner—Theodore M. Blum
Attorney, Agent, or Firm—Perman & Green

[57] ABSTRACT

An aircraft location and identification system, including a first position determining portion located aboard a transmitting aircraft for determining a first set of present positional and tracking information is described relative to said transmitting aircraft. A transmitting portion is included for transmitting the first set of present positional and tracking information to a receiving aircraft. A second position determining portion, which is located aboard the receiving aircraft, determines a second set of present positional and tracking information relating to the receiving aircraft. A computing portion is located aboard the receiving aircraft and/or a ground based facility. The computing portion utilizes present and past values of the first set of present positional and tracking information to derive a corresponding first probabilistic future tracking configuration of the transmitting aircraft. The computing portion also utilizes present and past values of the second set of the present positional and tracking information to derive a corresponding second probabilistic future tracking configuration of the receiving aircraft.

15 Claims, 6 Drawing Sheets

AIRCRAFT LOCATION AND IDENTIFICATION SYSTEM

This is a continuation of application Ser. No. 08/229,701 filed on Apr. 19, 1994, now abandoned.

FIELD OF THE INVENTION

The present invention relates to an aircraft location and identification system, and more particularly to a system which is carried aboard an aircraft and which is configured to interact with global positioning system (hereafter referred to as "GPS") satellites to provide the relative location of the aircraft and other aircraft in the vicinity, as well as a probabilistic future track of the other aircraft and the aircraft.

BACKGROUND OF THE INVENTION

The development of aircraft identification and locating systems has often been associated with navigational systems. Originally, and to some degree in today's airspaces, pilots interact with ground based air traffic controllers (hereafter referred to as "ATC") over radio, and relay their position with respect to known navigational aids and their altitude. This works well when there are relatively few aircraft in the airspace. Another consideration is that certain navigational systems and altimeter equipment have inherent navigational inaccuracies. Considering that pilots at certain times cannot precisely provide their position makes aircraft separation (which is a responsibility of air traffic controllers) more difficult and unreliable.

As aircraft navigational equipment has become more precise, pilots have correspondingly become capable of more accurately relaying their position to the ATC. This progression traditionally leads to closer spacings between aircraft. The progression from relatively inaccurate to relatively accurate navigational equipment which pilots have relied upon include, but are not limited to, the systems described in the remainder of this paragraph. Dead reckoning relies heavily upon the pilot being able to see the ground. Automatic direction finders (ADF) are located aboard aircraft which pilots use to determine the relative heading to a fixed non-directional beacon (NDB) (for example, the NDB is presently located at a relative geolocations of 45 degrees off the nose of the aircraft). Pilots use very high frequency omni-directional range (VOR) equipment to determine where the aircraft is located (the aircraft is located on the 090 radial of the VOR). LORAN and GPS systems both provide relative positions of the aircraft relative to the earth (often in a latitude and longitudinal format.) The LORAN and the GPS systems are often associated with a computer system which provides other navigational information, such as the required relative heading to travel to a desired location.

The GPS can provide an aircraft with accurate geolocation and time-of-day (TOD) information. Consequently, GPS is gaining acceptance in the aviation community as a valuable navigation tool. However, during flight aircraft don't generally know the position, speed, and heading of other aircraft. Instead, aircraft rely on computer-coordinated scheduling and the ATC system with its human operators and ground-based radar systems to control congested areas. As the amount of scheduled and un-scheduled air-traffic continues to grow, so does the potential for aircraft collision.

The use of transponders has increased the sophistication and accuracy by which the relative positions of two aircraft can be determined. A transponder is carried aboard each aircraft, and provides a return beam to an interrogatory radar beam produced by a ground based radar facility. The return beam is received by the ground based radar facility and displayed to the ATC (but typically is not displayed to the pilots.) The time of flight from when the interrogatory signal is transmitted from the ground based facility to the time that the return signal is received by the ground based facility provides distance information which can be computed in the ground based facility. The azimuth of the aircraft relative to the ground based facility can be determined by using known techniques. Similarly, altitude encoding transponders are capable of providing the relative altitude of the aircraft above the ground based station.

Transponders provide very accurate information of the aircraft's distance, azimuth, and possibly altitude to the ground based facility. However, transponders are an interrogatory type system (involving interrogation signals and return signals), and as such require relatively complex and expensive fixed radar equipment to be associated with each radar transmitter and receiver (which limits transponder interrogatory transmitters to ground based systems or very sophisticated aircraft.)

Another use of transponders is related to the generation of wingtip vortices by aircraft. Landing aircraft generate wingtip vortices which result in a wake of turbulence. Wingtip vortices can result in rough landings for aircraft following the aircraft producing the wingtip vortices, especially in cases where a relatively light aircraft is landing or taking off soon after a larger aircraft on the same runway. The FAA has established certain requirements for spacing between successive aircraft using the same, or closely aligned, runways.

Transponders are used to provide aircraft spacing information to the ATC relating to wingtip vortices and the to protect against excessive turbulence created thereby. Unfortunately, transponders and the radar associated therewith often do not provide information to the controllers relating to the precise time at which each aircraft takes off or lands, since radar coverage often does not extend to the ground. Under these conditions, the ATC does not know precisely when a plane takes off or land, so the spacing (time at which following aircraft are permitted to take off or land on the same runway) is uncertain.

Overhauling the current ATC system is a costly proposition, so it is desired that any new system rely largely upon existing technology. Besides, it is not clear that a new ATC system of largely the same form as the present system would help to significantly limit confusion. One simple and relatively inexpensive solution is to keep the current ATC system in place, but equip all aircraft with some form of warning system that can alert a pilots of closely positioned aircraft which are following a potentially conflicting trajectory.

U.S. Pat. No. 5,153,823 which issued Oct. 6, 1992 to Fraughton et al.; and U.S. Pat. No. 4,835,537 which issued May 30, 1989 to Manion illustrate systems which present navigational information from a first aircraft to another aircraft. If there is a probability of a collision, an electronic warning will be provided on board the second aircraft. The difficulty with these systems is that they rely upon past and present tracking information only. The tracking velocity used in predicting future collisions in these systems will not take probabilistic future tracking into consideration (there is no change in predicted future aircraft velocity and/or direction based upon changes of velocities of the aircraft.) Considering that collision avoidance is often based upon split second decisions by both the pilot and ATC, more reliable predictions about future aircraft tracking would be highly desirable. In addition, both of these prior art patents utilize only a single receiver.

It would be highly desirable to provide a system by which aircraft and ATC could more accurately determine future projections of paths of travel of other aircraft, relative to their aircraft, in their vicinity. It would be preferably that this system be a non-interrogatory type system. Non-interrogatory type systems are also preferred since the channels required for these transmissions are numerous. In congested airspace, congested channels are capable of providing erroneous or conflicting information.

SUMMARY OF THE INVENTION

The foregoing and other problems are overcome by an aircraft location and identification system, including a first position determining portion located aboard a transmitting aircraft for determining a first set of present positional and tracking information described relating to said transmitting aircraft. A transmitting portion is included for transmitting the first set of present positional and tracking information to a receiving aircraft. A second position determining portion, which is located aboard the receiving aircraft, determines a second set of present positional and tracking information relating to the receiving aircraft. A computing portion is located aboard the receiving aircraft and/or a ground based facility which utilizes present and past values of the first set of present positional and tracking information to derive a corresponding first probabilistic future tracking configuration of the transmitting aircraft. The computing portion also utilizes present and past values of the second set of the present positional and tracking information to derive a corresponding second probabilistic future tracking configuration of the receiving aircraft.

It is significant in the present invention that the time of day (TOD) signals from GPS satellites are provided into a Kalman filter to determine the future probabilistic tracking of each of the aircraft on the screen. The distance that an aircraft travels in any set period (such as between subsequent GPS signals) changes depending upon the velocity of the aircraft. Velocities of the aircraft are utilized by the Kalman filter in determining future potential trajectories of the aircraft. The future probabilistic tracking and present location of the aircraft are used to determine the probability of collision based upon the potential tracking of the other aircraft. If the probability of intersection of the two trajectories of the aircraft reach a predetermined threshold, then an alarm will sound. Similarly, the probability of intersection of the two trajectories could be displayed on a display within the aircraft, and as seen by air traffic control.

BRIEF DESCRIPTION OF THE DRAWINGS

The above set forth and other features of the invention are made more apparent in the ensuing Detailed Description of the Invention when read in conjunction with the attached Drawings, wherein:

FIG. 3b illustrates a block diagram of the data separation of the frequency signals in the data signals of FIG. 3a.

DETAILED DESCRIPTION OF THE INVENTION

Figure 1:
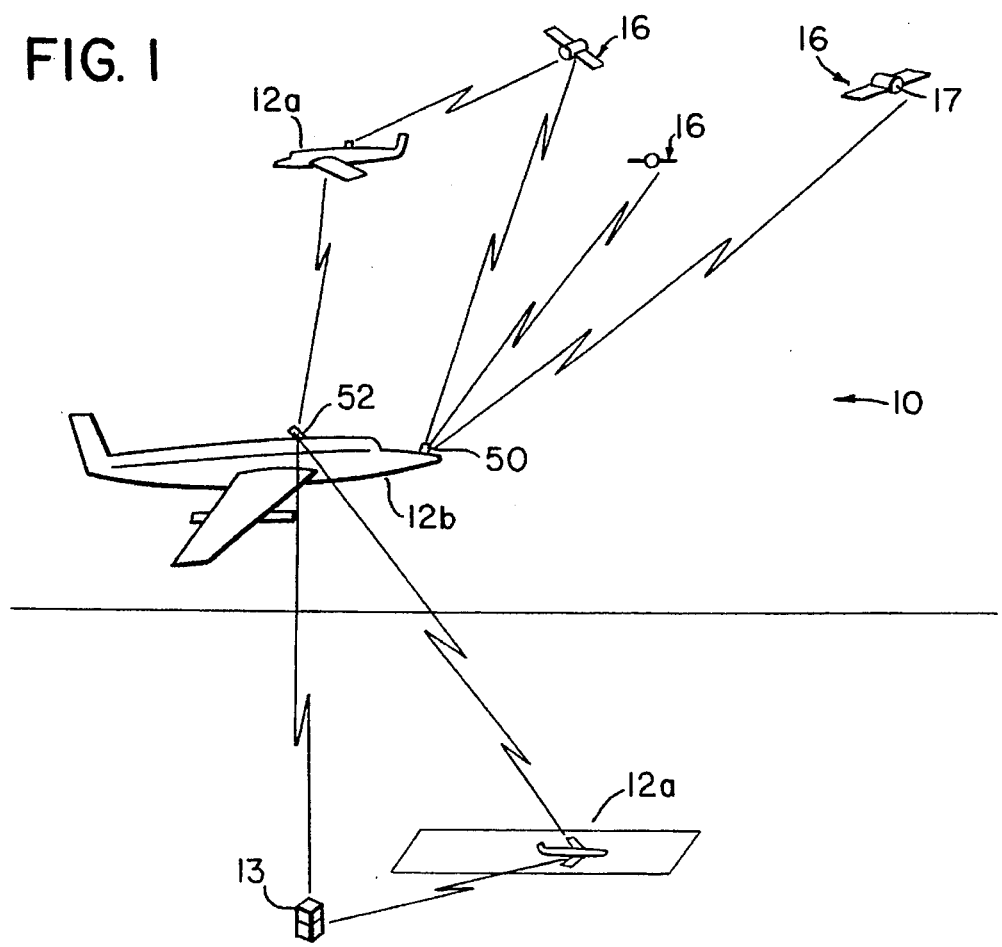
FIG. 1 illustrates an illustration of one embodiment of the application of an Aircraft Location and Identification System (ALIS) of the present invention.

Similar elements which perform similar functions in the different embodiments of the present invention will be provided with the same reference character. The specific channel communication protocols, as well as the specific positional information transmitted from a transmitting aircraft to a receiving aircraft, described in the present invention is intended to be illustrative in nature, and not limiting in scope. While probabilistic techniques are described in the present disclosure, it is also within the scope of the present invention to utilize possibilistic techniques, such as fuzzy logic, which are well understood in the art, and documented in the literature.

Probabilistic Future Tracking

Figure 8:
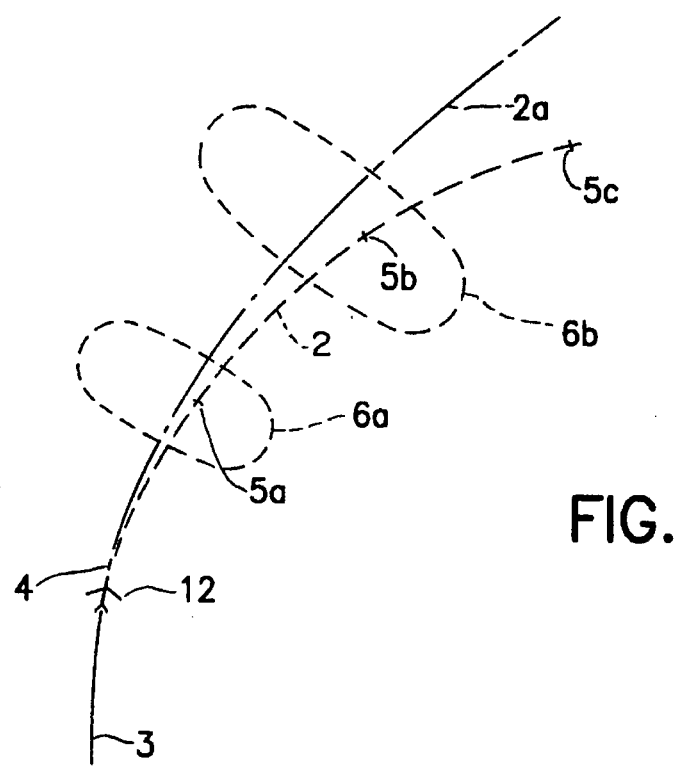
FIG. 8 illustrates a top view of an aircraft future probabilistic or possibilistic tracking, as utilized in the present invention.

FIG. 8 illustrates a most probable future path 2 that an aircraft 12 would take when travelling through the air. This most probable future track 2 (in this disclosure, the term "track" includes both heading and velocity) is determined by a number of considerations including the present heading and velocity of the aircraft, the type of aircraft (its performance ranges), the attitude of the aircraft, etc. The most probable path is indicated by a curve which is assumed to be a logical continuation of the past track 3 and present track 4 into the future. Various rules can be applied to modify the most probable path. For example if an aircraft is in a position to line up for a runway, it is highly probable that the aircraft will follow the glidepath regardless of the instantaneous present track.

The most probable future track is defined by a continuum of most probable future positions 5a, 5b, 5c, etc. The most probable future positions are distinguished by the time that they occur. For example, point 5a may define the most probable location after 5 seconds; point 5b defines the most probable time after 10 seconds, and 5c is the most probable time in 15 seconds after the present time.

Figure 2:
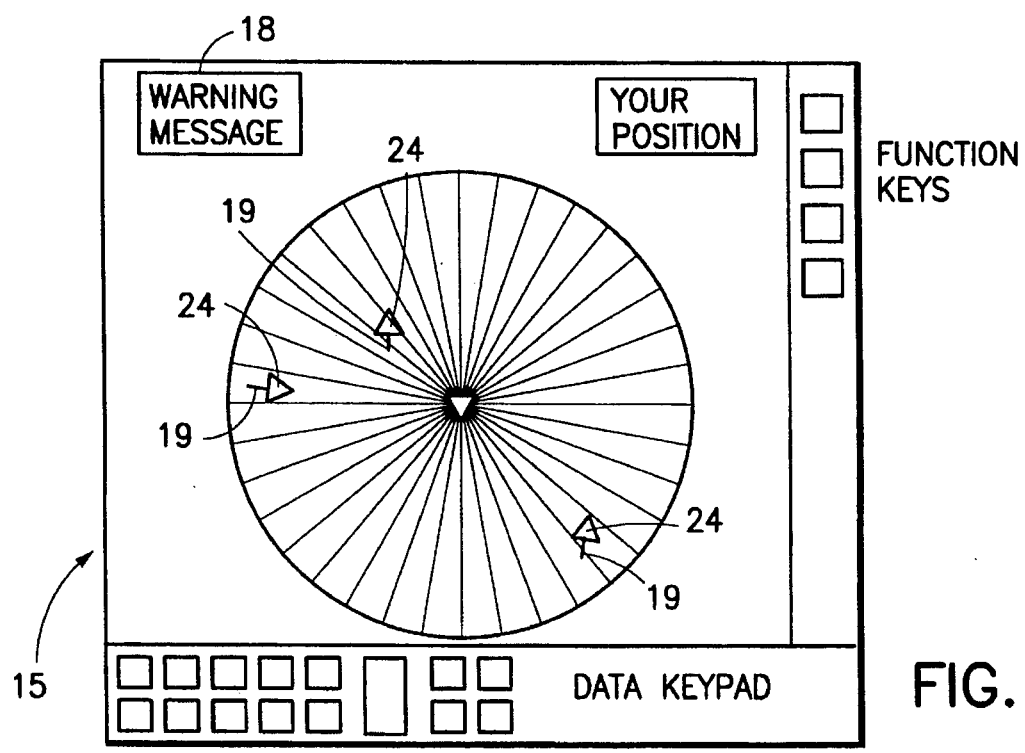
FIG. 2 illustrates a schematic diagram of one embodiment of ALIS display to be incorporated in each aircraft.

It is important to emphasize that the most probable future track 2 of FIG. 2 often changes instantaneously and continuously. For example, while the track 2 indicates the most probable future track at the present instant, assume that the pilot applied some left rudder to reduce the severity of the right turn which the aircraft 12 is presently following. The most probable future track would change, for example, from the line 2 illustrated in FIG. 8 to the dotted line 2a. Similar changes would occur in the future most probable track 2 if any attitude of the aircraft is altered, if the aircraft encounters a different wind, if the power setting of the aircraft is altered, or any of a multiple of scenarios. An assumption is that since aircraft maneuvers are typically performed smoothly, if some deflection is made to the general flight path of an aircraft, that the aircraft will continue to make that deflection in the near future. For example, if the aircraft is reducing the relatively severe right bank that the aircraft is presently tracking in FIG. 8, then it is assumed that the pilot will continue to reduce the severity of the right hand bank.

Associated with the most probable future track 2 is a volume of a certain probability. FIG. 8 is a top view, so any projected volume will appear as an area, but assume that what applies to an area defined in the horizontal plane also applies to an area in the vertical plane as well.

The present invention is closely associated with defining volumes of a predetermined probability using techniques described below. Since it is never quite certain which path an aircraft is going to follow, projecting future flight paths is best associated with probabilistic or possibilistic techniques. It can be said that an aircraft, while considering its past and present tracking, will be within a specified volume, at a specific time, with a specified probability. For example as illustrated in FIG. 8, it can be stated that aircraft 12 will be defined within the volume 6a, at 5 seconds from the present time, with a probability x (x represents some real number.) There is some probability that the aircraft will be outside of the volume 6a if the aircraft goes into some radical attitude; however for probabilistic tracking, volume 6a provides a reasonable estimate of where the aircraft is likely to be located in 5 seconds. Similarly, the volume 6b defines where the aircraft 12 is likely to be located with a probability x in 10 seconds after the present time. Note that the volume 6b is considerably larger than the volume 6a, since the further one projects into the future, the less certain is the volume which the aircraft is likely to be within. The size of the volumes 6a, 6b, etc. will therefore increase in size the further one takes the probability or possibility into the future.

The present invention provides a technique for computing where the probabilistic volumes 6a, 6b of more than one aircraft will be at a certain time in the future. If there is an intersection between the probabilistic volumes of two aircraft in the near future, there should be a warning provided to the pilot of the aircraft as well as the ground control crew that there is some probability of intersection. However, these projections should not be taken too far into the future since the probability of actual collision remains very small. For example, the probabilistic volumes of an aircraft taking off from New York would likely intersect the probabilistic volumes of an aircraft taking off from Boston, Mass. within a half hours time since the two aircraft would reasonably be located at the same location after a half hour, with both aircraft being within their probabilistic volumes. However, there is very little probability that the aircraft will actually collide. Therefore, there should be some reasonable time that the probability volumes should be monitored for intersection. However, if a reasonable portion of the probabilistic volumes of the two aircraft intersect in the reasonable time, then each of the aircraft, as well as the controlling ground crew, should be given a warning.

ALIS

The use of an Aircraft Location and Identification System (hereafter referred to as "ALIS") 10 is illustrated in FIG. 1. The use of ALIS 10 requires components to be inserted in each participating aircraft 12a or 12b as described below. For the purpose of this application, a differentiation is made between a transmitting aircraft 12a which is an aircraft which is transmitting its positional information to another aircraft and/or a ground control facility 13, and a receiving aircraft 12b which is an aircraft which is receiving positional information from other aircraft. All receiving aircraft have a display 15 (see FIG. 2) which illustrates the respective positions of all aircraft. In actuality, it is envisioned that all aircraft will be both transmitting aircraft and receiving aircraft at all times when in flight, however this nomenclature is used to describe the appropriate portions of the ALIS system and the functions of each. The ALIS in each participating aircraft has components which interact with each other to provide both transmitting and receiving capabilities.

The ALIS 10 interacts with GPS satellites 16 and/or an internal navigation unit (not illustrated) to derive positional information. The ALIS 10 is a compact, low-cost electronic system that is designed for use by both civilian and military aircraft. ALIS provides a means for an aircraft to automatically locate and identify other aircraft in its vicinity, especially those which are on a path which may interfere with other aircraft. ALIS performs this function and displays the results on the display 15.

Even though the display illustrated in FIG. 2 is envisioned to be of the cathode ray tube of the heads-down variety, it is also possible to use a heads-up display of the type which have become accepted in military and more sophisticated civilian aircraft. The display 15 illustrates present aircraft locations 19, as well as relative probabilistic or possibilistic future tracking (in this disclosure, the term "tracking" is defined as the velocity and direction of the aircraft) indicated by lead lines 24, and identifying information (not illustrated) of nearby or approaching aircraft in the form of typed letters and numbers for each aircraft. A distinction is made in this disclosure between "present tracking" which utilizes present positional information to derive the display aircraft tracking of the prior art systems; and "future tracking" which utilizes probabilistic or possibilistic techniques applied to prior and present positional data to determine aircraft tracking of the present invention.

This probabilistic locating of future transmitting aircraft 12a is especially useful in warning a pilot of a potential collision situation, so that timely and appropriate corrective actions can be taken on the part of the receiving aircraft (considering that both aircraft are actually simultaneously functioning as transmitting aircraft and receiving aircraft.) There is a warning panel 18 incorporated in the display 15 in case the potential future trajectory of any other aircraft participating in the ALIS is too close to the receiving aircraft (the display 15 is mounted aboard each receiving aircraft.)

The length of the lead lines 24 are proportional to the probalistic future velocity of the aircraft as determined by adaptive filtering techniques. The lead lines 24 are positioned to illustrate the future tracking (determined by probabilistic techniques, namely a Kalman filter) of all of the transmitting aircraft 12a in the vicinity of the receiving aircraft 12b, as well as the receiving aircraft 12b. Therefore, production of the lead lines depends upon probabilistic or possibilistic approaches. The technique utilized in computing the length and position of the lead lines 15 involves the use of adaptive filtering, and more particularly, Kalman filtering. The use of Kalman filtering has demonstrated itself to be very robust, has been described in the literature including chapter 3 of *Optimal Filtering*, Anderson et al., Prentice Hall, 1979; and Part II of *Adaptive Filtering Prediction and Control*, Goodwin et al., Prentice Hall, 1984, and is described somewhat in the following.

The ALIS 10 can also support a variety of specialized functions. During the take-off or landing phases of flight, ALIS can supply the air-traffic control (ATC) site (13-FIG. 1) with an independent indication of the position, speed and heading of an egressing or ingressing aircraft.

This information is particularly important considering the aircraft congestion that exists over today's airports.

The ALIS 10 is designed to automatically and continuously broadcast a data signal which informs all nearby receiving aircraft 12b of the identity, position, probabilistic speed, compass-heading, and any other desired information of the transmitting aircraft. ALIS is also designed to receive similar data from other transmitting aircraft 12a in the vicinity. On reception, ALIS processes the data signals and displays current and predicted positional information to the pilot. The amount of data presented to the pilot is limited because the operational range of ALIS (for example, 50 nautical miles) is intentionally limited to the diameter of the display 15, in which the receiving aircraft is centered, in which each aircraft is transmitting over a distinct particular channel.

Zones

Figure 6:
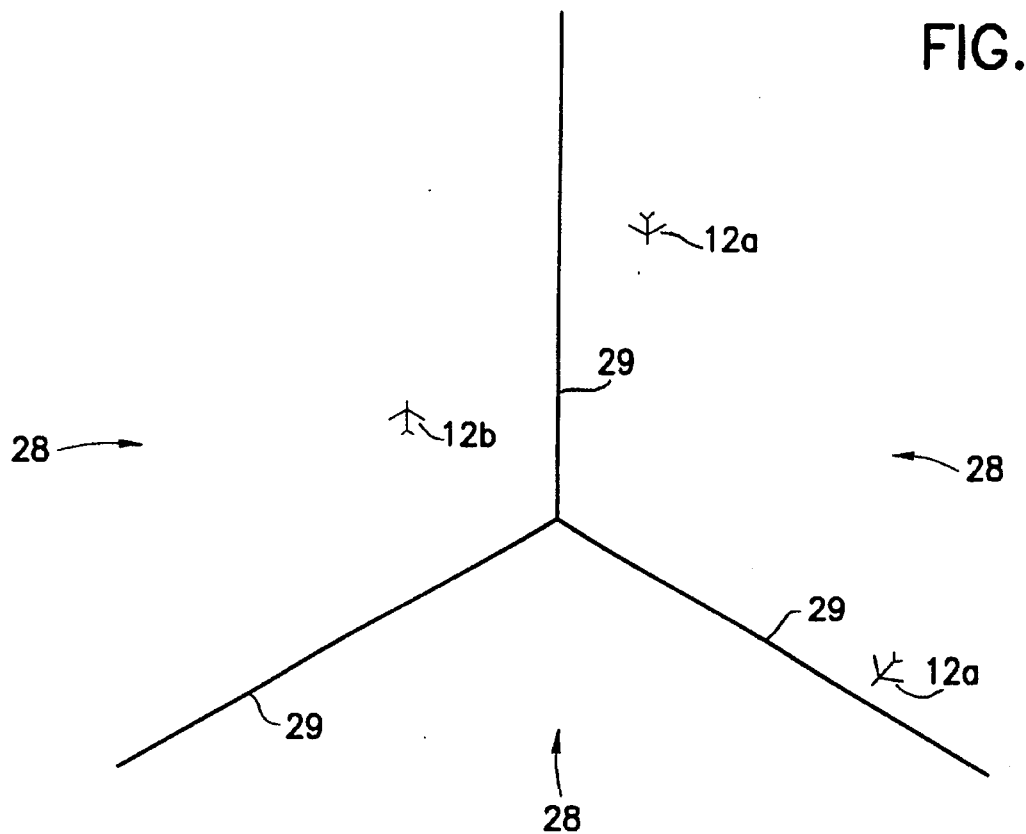
FIG. 6 illustrates a schematic top view of plurality of aircraft located in different zones.

The selection of which channel each aircraft transmits over is based upon zones 28 in FIG. 6. Zones are utilized by transmitting aircraft in determining channels to operate under as described, but play no function in receiving aircraft. Each zone 28 (see FIG. 6 which illustrates a top view of an intersection of several zones) is defined in this disclosure as the airspace above a fixed area on the ground. A computer included on board the aircraft has stored data, based on GPS position, of the correct zone and the applicable channel. As a transmitting aircraft passes across a border 29 from one zone 28 to a neighboring zone, there is a handoff procedure which automatically changes the frequency channel which the transmitting aircraft is transmitting over whenever a transmitting aircraft enters another zone. The ALIS 10 of all receiving aircraft 12b in the area will be receiving signals from each transmitting aircraft in its vicinity (within the range of the displays.) The display of the receiving aircraft will position the receiving aircraft in the center of the circular display, with all other transmitting aircraft within the vicinity of the receiving aircraft appropriately positioned out from the center of the display depending upon the present direction and distance (and predicted tracking) of the transmitting aircraft from the receiving aircraft.

Figure 3A:
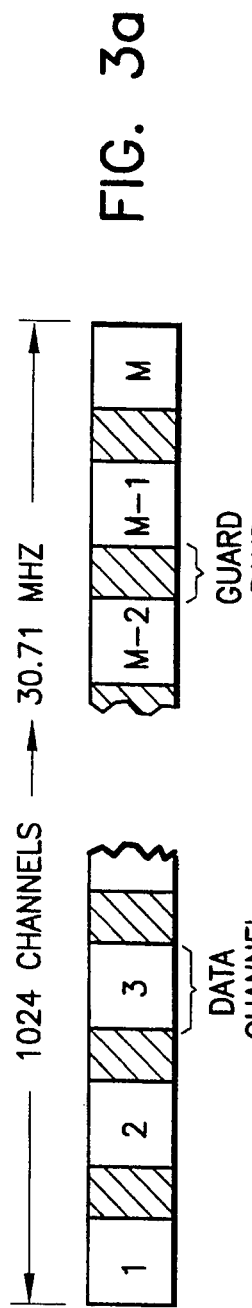
FIG. 3a illustrates a block diagram of the format of the ALIS data signal, incorporating a contiguous series of data packages or frames.
Figure 3B:
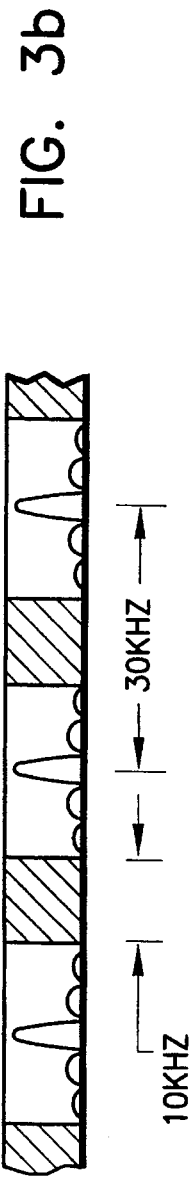

ALIS allocates data channels by frequency multiplexing in FDMA systems, i.e., by assigning a unique RF carrier frequency to each aircraft operating within a designated geographical zone. As one embodiment of the channel configuration, 1024 such frequency channels are allocated as shown in FIG. 3a and 3b. Since ALIS is intended as a local form of ATC (i.e. zones cover approximately 50 nautical miles or less) these channels can be re-assigned and hence re-used in other distant geographical zones. It is preferred that neighboring zones utilize different channels to limit frequency congestion. Channel assignments can be readily made by the current ATC system, and changes of channel is made by an automatic channel handoff within the software of the transmitting aircraft 12a utilizing known handoff software. CDMA systems are also within the scope of the present invention. However modifications would have to be made to the channel assignments and the appropriate transmitters and receivers from the FDMA embodiment. The entire ALIS 10 would have to function under either CDMA, TDMA, or FDMA; but not generally a combination of these.

Furthermore, it is desirable to assign different bands to commercial aircraft, private aircraft, and military aircraft. All bands can be detected by all of the receiving aircraft, however, the receiving aircraft and ATC would have some indication of what type of transmitting aircraft is indicated by a marker on the display (by considering the associated channel.) A receiving aircraft close to the edge of a zone will receive a signal from a transmitting aircraft in another zone since the display 15 of FIG. 2 illustrates the receiving aircraft at the center. It may also be useful to assign different bands to aircraft at different altitudes. Therefore, there may in fact be a plurality of separate, microwave channel regions that are occupied by ALIS data signals. One advantage to this separation is that the potential for conflicts, i.e. multiple aircraft operating on the same ALIS channel, is reduced. In addition, a crude form of identification can be provided by default.

Differentiation between the different channels may follow the principles of code division multiple access or frequency division multiple access (FDMA, as illustrated in FIGS. 3a and 3b.) The use of CDMA (not illustrated) and FDMA is well established and will not be further detailed herein. FDMA produces a data link which is less prone to interference when compared to time division multiple access schemes. FDMA and CDMA also eliminate the need to limit broadcast to certain periods as is the case with TDMA, thereby simplifying transmissions. The use of specific communication schemes in the present invention is intended to be one of design choice, and not to be limiting in scope. The communication schemes believed to be the most applicable are presented herein.

ALIS uses a differential phase-shift keyed (DPSK) continuous wave (CW) signal for data transmission, i.e. each piece of information is phase-encoded on a CW carrier signal as a certain number of binary digits or bits. Each bit of data corresponds to a 500 μsec segment of the CW waveform, which is defined as the signalling interval. A binary "1" or "0" is defined by periodic signals that are 180 degrees out of phase with some defined reference phase, i.e., the RF carrier is bi-phase modulated so that phase transitions away from the reference phase (e.g. binary "1") encode the opposing bit (e.g. binary "0").

Figure 5:
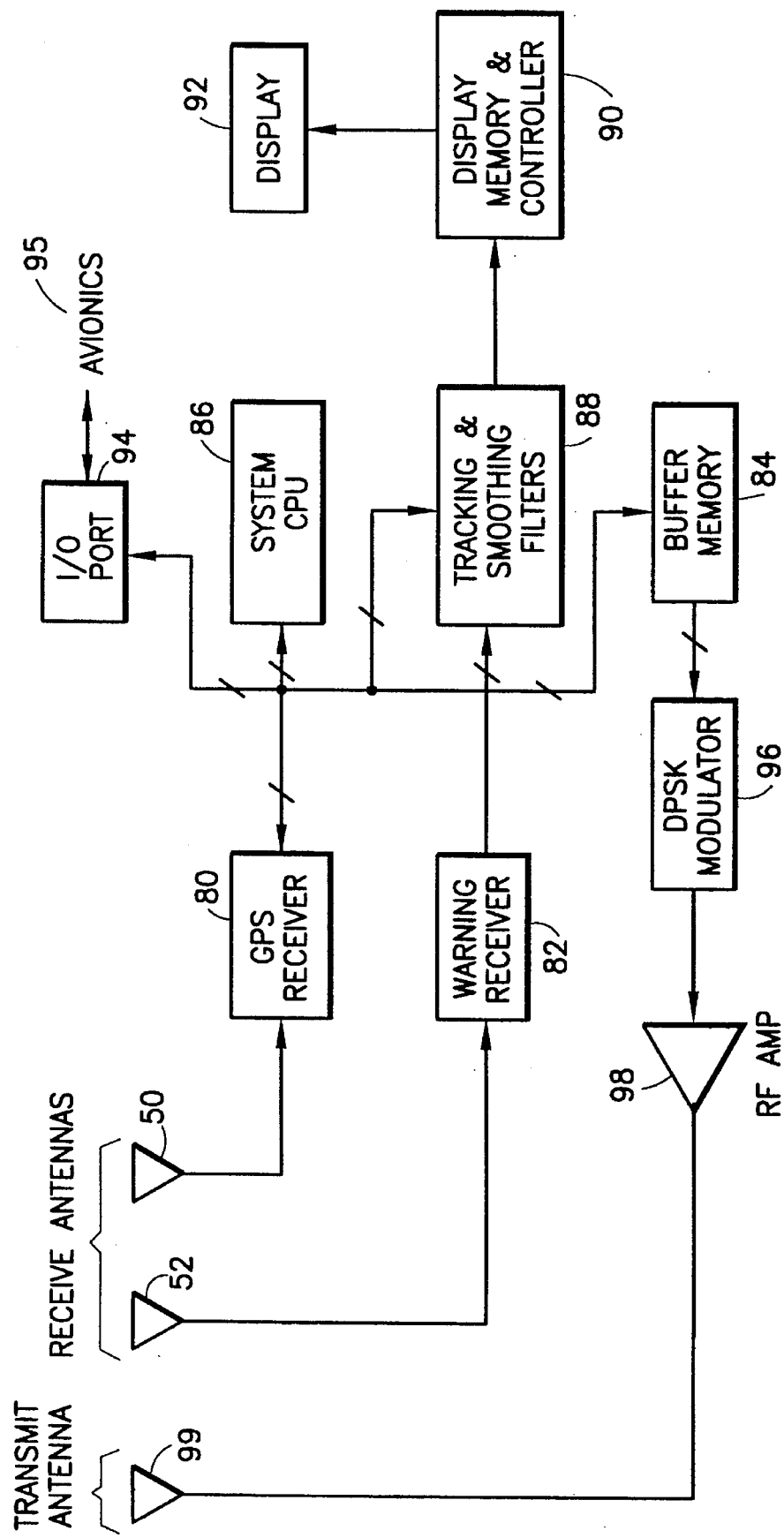
FIG. 5 illustrates one embodiment of the hardware components utilized by the ALIS.

Typically, the spectral region occupied by the data signal is approximately 20 KHz in width as shown in FIG. 5. Each RF channel is separated by a guard-band that is 10 KHz in width. Therefore, the total bandwidth of the ALIS signal spectrum is roughly 30.71 MHz, assuming an initial allocation of 1024 channels. More channels can be added by expanding the total bandwidth of the ALIS spectrum, e.g. a mere 62 MHz of total bandwidth would provide 2048 channels.

It is preferred that the frequency of the RF carrier waveform be in the microwave region, e.g. 9 GHz, consequently, the percent bandwidth occupied is minuscule, i.e. much less than 1 percent of the available bandwidth. More important, the potential for external interference is greatly reduced.

Probabilistic Collision Avoidance

Whenever the ALIS of a receiving aircraft 12b identifies a potentially dangerous situation with other transmitting aircraft 12a (as determined probabilistically utilizing a Kalman filter as described in the "SYSTEM SOFTWARE" portion of this disclosure) becoming too close to the receiving aircraft 12b, the pilot is immediately warned by a suitable warning so that appropriate corrective actions can be taken. Effective implementation of ALIS requires that all aircraft which are operating in the same general area (in which the area is operating under ALIS) be ALIS equipped.

ALIS automatically supplies any other aircraft capable of receiving the ALIS signal with the following data package 35 of information by interaction with the GPS transmitter (see FIG. 4):

a. a unique aircraft-identification-code (AIC) 36;

b. geolocation 37 (including latitude 38, longitude 39, and altitude 40);

c. time-of-day (TOD) information 42; and d. speed 44 and compass-heading 46 of the transmitting aircraft.

The TOD information is especially significant since the receiving aircraft can use the TOD to determine how applicable the associated message is (whether the signal contains stale information or not.) It can also be used in determining the difference in position and velocities between two subsequent ALIS transmissions, which can be utilized to determine future tracking probabilistically.

Probabilistic future tracking is computed utilizing velocities that are input into adaptive (Kalman) filters. If the aircraft is accelerating along a specific axis (longitude, latitude, or elevation), then the distance travelled over a fixed time frame will increase along that axis. GPS satellites are used to determine very accurate positions of aircraft over such a fixed time frame. Therefore, an acceleration or deceleration of an aircraft can be computed as a difference in velocity over a given time. The acceleration and decelerations are computed on board the receiving aircraft for both the receiving and transmitting aircraft, utilizing information received within the data package 35.

The receiving and transmitting aircraft's present position and velocity can be input into a Kalman filter to provide a more reliable future tracking outline than in prior systems which rely upon only on present tracking information. If an aircraft has a specific acceleration (or deceleration) at a given time, it is assumed that in the near future, the acceleration will remain similar. This is a reasonable assumption since aircraft pilot techniques emphasize relatively smooth in-flight transitions. This acceleration can be used to compute the future track of the aircraft.

The AIC 36 contained within the data package 35 contains the aircraft type of the transmitting aircraft sending the AIC. The receiving aircraft thereby knows what type of aircraft (an airliner or a helicopter, for example) each transmitting aircraft is. Once the receiving aircraft knows the type of each transmitting aircraft, it can access stored data banks located in the ALIS of the receiving aircraft to produce the operational characteristics of each transmitting aircraft by altering gain coefficients applied to the Kalman filters of the present disclosure.

Figure 4:
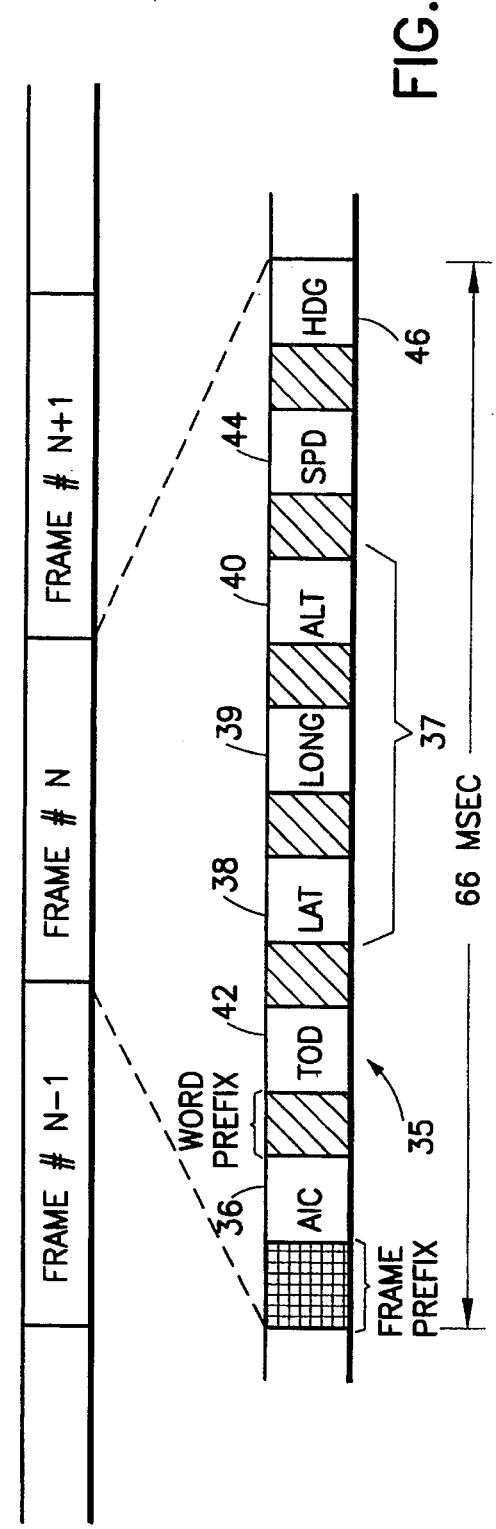
FIG. 4 illustrates one embodiment of spectral region occupied by a data package within each frame (which is approximately 20 KHz) of the ALIS, this data package may be transmitted by either FDMA (as illustrated) or by CDMA.

Each data frame of FIG. 4 is preceded by a segment or prefix that contains a pseudo-noise (PN) sequence, which serves as a marker and identifies where the signal originated. Similarly, each data item or word (AIC, LAT, etc.) is also preceded by a shorter PN prefix, which again serves as a marker.

In this disclosure, the term "INU" is used, and is meant to include both inertial navigation units as well as inertial navigation systems. The inertial navigation units are those systems which provide the aircraft with information relating to the its geoposition. The inertial navigation systems are more commonly used in military aircraft, and provide the aircraft not only with its geoposition, but also typically utilizes gyros to provide information relating to the attitude (roll, bank, and yaw) of the aircraft.

ALIS updates this information package periodically, preferably with a period in the millisecond range (78 msec, has been found to be suitable.) The geolocation 37 data may be determined using either an internal navigation unit (INU) as are present aboard most modern airliners, or position information directly from the GPS satellites, or a combination of the GPS and INU information as described below. The equipment selected to be utilized by ALIS to provide positional information is preferably the most accurate positional information equipment in the aircraft. It is worth noting that the determination of the position of the aircraft is determined by the receiving aircraft, so the communication requirements to transfer excessive future tracking information of each aircraft is obviated. The future probabilistic tracking of each transmitted aircraft is determined aboard each receiving aircraft in the general vicinity.

The geolocation 37 and TOD data 42 in the ALIS can be derived from GPS transmitters 17 located aboard GPS satellites (see FIG. 1). There are presently an array of GPS satellites traveling in distinct orbits above the earth. Each GPS transmitter 17 emits a known signal, which contains a code that uniquely identifies the satellite.

Because the geolocation of each GPS satellite is known, and the distance from the GPS transmitter (which is located on the GPS Satellite) to the GPS receiver 80 see FIG. 5 (which is located aboard both the transmitting aircraft 12a and the receiving aircraft 12b) can be computed at any particular time, triangulation techniques can be used to compute the precise geolocation of an aircraft. Triangulation is well known in GPS applications, and is one of the basic principles utilized in GPS navigation to provide positional information. Triangulation requires receiving and identifying the signals from at least three GPS satellites, measuring the time-difference-of-arrival (TDOA) of those signals. (as derived from the TOD signals), and thereby compute the geolocation, present tracking, and present heading of the transmitting aircraft 12a. The velocities are determined in GPS as a distance the aircraft has travelled between two distinct signals, divided by a difference in time of the two TOD signals. Accelerations can be computing as the difference in computed velocities between two subsequent TOD signals divided by the intervening time.

Reliance upon GPS in aviation navigation has become more accepted in the aviation community in the past several years, so implementation and acceptance by pilots and AIC of the ALIS, which relies largely upon GPS and/or inertial navigation unit (INU) information should be more straight forward than developing an entirely new system.

The receiving aircraft is computing its own geolocation, velocity, direction, and velocity as well as receiving a similar set of information for each transmitting aircraft in the area. These sets of information are input into a computer (not illustrated) on board the receiving aircraft which computes the relative position, velocities, paths of travel, and probability of path intersections between all transmitting aircraft and the receiving aircraft.

A GPS receiver that processes three GPS satellite signals can provide any aircraft with accurate latitude (LAT) and longitude (LONG) information, while a receiver that processes four satellite signals can also provide altitude information. Therefore, as a minimum requirement, the GPS receiver of the ALIS should interface with three GPS satellites, while obtaining altitude information from the aircraft's altimeter. One advantage of a four-satellite GPS receiver is that it eliminates a required interface with the altimeter, which is beneficial since altimeters may be relatively inaccurate. An ALIS receiving four GPS satellites is capable of determining its precise longitude, latitude, and also altitude. If communication with one of the GPS satellites is lost, the system reverts to a three-satellite GPS system.

Speed and compass-heading of the transmitting aircraft may be obtained from its own avionics system (or alternately from the GPS computation.) The heading and speed data are modified in the present invention based upon the acceleration of the aircraft, and then combined with the Aircraft Identification Code (AIC) 36, the geolocation data from GPS, and the TOD data to form an ALIS information package, which is then transmitted over the airwaves for use by other ALIS-equipped aircraft.

System Description

ALIS includes of a number of hardware modules shown in FIG. 5. The ALIS receiver module includes two separate receivers including a conventional GPS receiver 80 and a warning receiver 82. The GPS receiver 80 provides geolocation and TOD data to the aircraft which the receiver is aboard (all aircraft function as both transmitting aircraft and receiving aircraft). The GPS receiver 80 is constructed as a series of digital correlators which decode the GPS signal and measure the various TDOAs. The triangulation algorithm is resident in the GPS receiver 80. Therefore, the output of the GPS receiver is a series of digital word groupings (e.g. four 12 bit words) that contain the geolocation, altitude, and the corresponding TOD data. These groupings are sent to the buffer memory 84 under system central-processing-unit (SCPU) 86 control.

Also included in ALIS are tracking filters 88 (which utilize Kalman or other adaptive filtering techniques), a display memory and controller 90, a display 92, an input/output (I/O) port 94 which is in communication with the aircraft's avionics and/or INU unit 95, a DPSK modulator 96, and a radio frequency amplifier 98, which is in communication with a transmitting antenna.

The ALIS warning receiver 82 scans its assigned frequency band to intercept the data signals from other transmitting aircraft in the general vicinity. The warning receiver consists of a compressive receiver for signal acquisition purposes, and a frequency-stepped superhet/digital correlator for decoding the data in a given channel. The data items contained in each intercept are processed by tracking (Kalman) filters by determining the aircraft's (transmitting or receiving) present position, direction, and velocities. The receiving aircraft can then compute a probabilistic future track of each of the aircraft within a desired distance from the receiving aircraft. The Kalman filtered future tracking data can then used by the SCPU 86 to determine the likelihood of a collision, and by the display controller 90 to provide a suitable cockpit presentation. The ALIS does not require an interrogation signal as is the case with radar (transponders.)

The ALIS transmitter combines the geolocation information with the speed, the compass-heading, and the AIC of the host aircraft to form a data package, which is then fed to the modulator for encoding into the DPSK format before being transmitted over the airwaves. For an operational range of approximately 50 nautical miles, the minimum requirement for the saturated power output of the RF amplifier 98 is estimated to be 1 mW (0 dBm). Assuming an operating frequency of 9 GHz, a signal-to-noise ratio (SNR) at the input of the warning receiver of 15 dB, a receiving system noise-figure (NF) of 6 dB, and a receiving antenna gain of nominally 0 db. Since the operational bandwidth is so small, a solid-state RF amplifier is a logical and cost-effective choice.

The system antennas are conventional and readily integrated into the air-frame. For instance, the receiving antenna 50 (see FIG. 1) is associated with the GPS receiver 80, and is of the type typically constructed of small spirals or perhaps patches owing to the very narrow operational bandwidth. The desired pattern for reception is omni-directional, which is easily obtainable. The transmitter and the warning receiver can share an antenna 99; but the warning receiver may also have a separate antenna 52.

All interfaces with the aircraft avionics are accomplished through an input/output (I/O) port 94 which is compatible with the aircraft's computer-bus structure and format. The actual configuration of this interface may be aircraft specific. It may be possible to design the I/O port 94 to be software re-configurable.

In an alternate embodiment, speed and heading are obtained through GPS data analysis., and construct from the most probable future path 2 of FIG. 8. a projected cone identical to that projected by the probable track of the Kalman filter. The further along the future track (the greater time from the present) that any aircraft is travelling, the more variations and deflections that can occur from a known path. For example, a matter of a second after the present time, it is relatively easy to predict where the position and track of an aircraft will be; however, in several minutes, the aircraft could easily have reversed directions, climbed, or deviated drastically from the most likely path.

The ALIS system can provide a full three-dimensional indication of position (i.e. latitude, longitude and altitude) which is independent of the aircraft avionics. This will require that the ALIS system track a minimum of four GPS satellites. Although this requires a four channel GPS receiver in the GPS portion of the ALIS system, it does eliminate the need to interface with a diverse grouping of aircraft avionics. Furthermore, the application of ALIS is expanded considerably to include situations where it is impractical or impossible for the aircraft to provide altitude information.

By modifying the GPS sub-system of ALIS, it is possible to estimate aircraft heading and airframe orientation in three-dimensional space. Indications from the on board avionics (typically utilizing gyros) can supply attitude characteristics such as pitch, yaw, and roll. The altitude coordinates are utilized by the Kalman tracking filters in determining what the likely future tracking of the receiving aircraft will be. In fact, ALIS could be considered as a potential back-up for those systems, or event the primary avionic system. Various systems such as provided in this paragraph may be utilized to add to the sophistication and reliability of the results. It is likely that some of these systems should not be utilized by smaller, less sophisticated aircraft.

Near airports, a very precise differential GPS technique may be used to improve the overall accuracy of the ALIS system. This requires an additional ALIS system to be located in the vicinity of the airport, e.g. in the control tower. This local airport system serves as a known reference point for the differential position computation. The indication of the aircraft's location can be improved by removing uncertainties using the fixed and known position of the ALIS system at the airport. In this case, the basic architecture of an individual ALIS system would not significantly change. However, the computational software will be affected.

System Software

Figure 7:
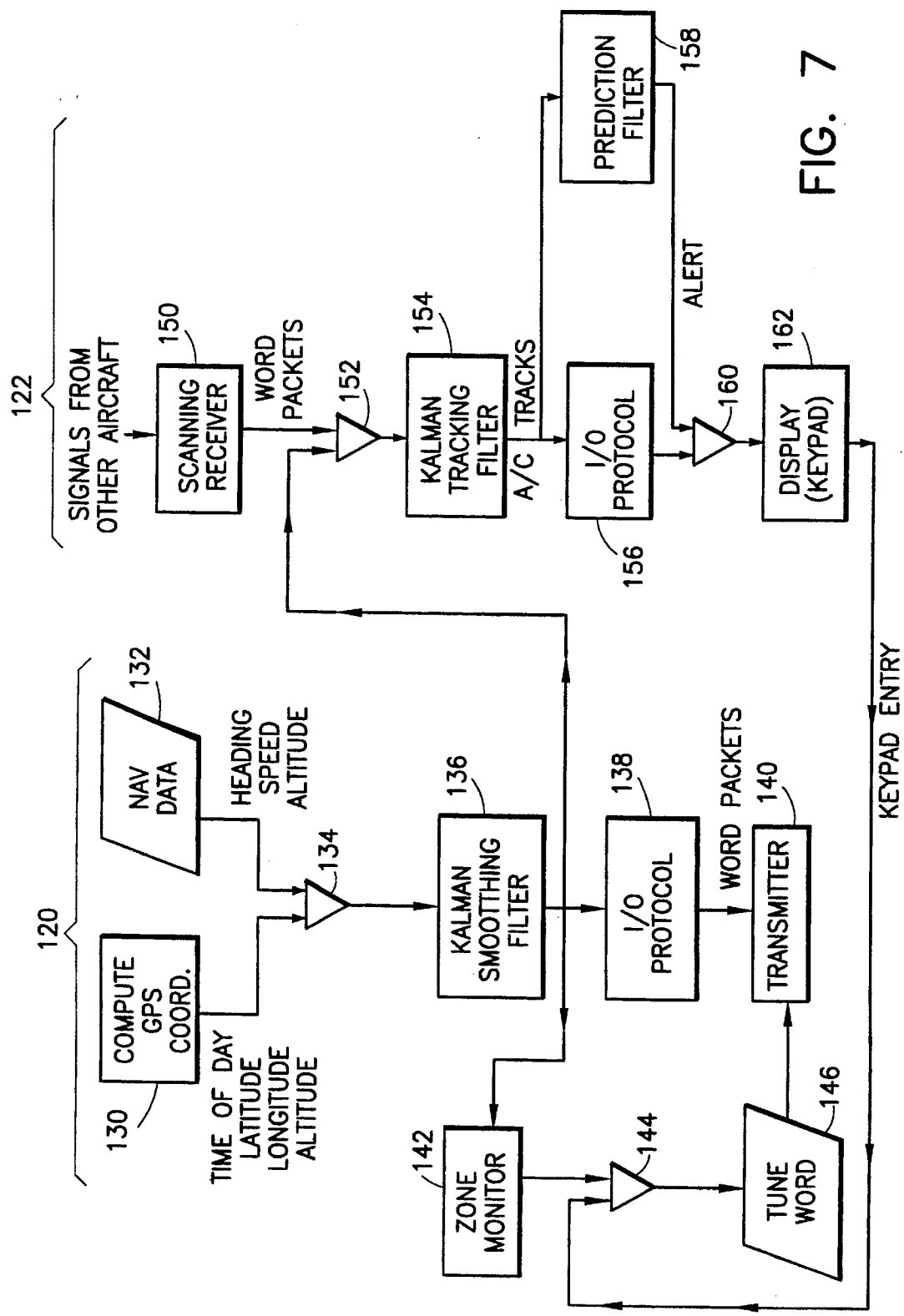
FIG. 7 illustrates a schematic diagram of one embodiment of the software components utilized by the ALIS.

FIG. 7 illustrates the software components associated with the ALIS system. The ALIS system software includes a transmitting portion 120 and a receiving portion 122. While the following components are described as belonging to either of the two portions, it is to be understood that there is considerable transfer of data and function between the components of the different portions as illustrated in FIG. 7, so certain software segments actually function in both portions.

The transmitting portion 120 includes a Compute GPS Coordinate Segment 130, a Navigation Data Segment 132, a data combiner 134, a Kalman Smoothing Filter Segment 136, an Input/Output Protocol Segment 138, a Transmitter Segment 140, a Zone Monitor Segment 142, a data combiner 144, and a Tune Word Segment 146.

The Compute GPS Coordinate Segment 130 is similar to that contained in most prior art GPS software programs. The data obtained in this portion provides time of day, the latitude, the longitude, and the altitude (if there are four GPS satellites 16 in communication with the GPS receiver.)

The Navigational Data Segment 132 is similar to that contained in most present day digital INU units. The data obtained in Segment 132 provides the heading, airspeed, and altitude of the aircraft. Segment 130 and Segment 132 contain all of the positional information available to the ALIS system. The data combiner 134 combines the data from Segments 130 and 132, and based upon this data computes the position, velocity, and acceleration of the aircraft. This invention is input into the Kalman Smoothing Filter Segment 136.

The Kalman Smoothing Filter Segment 136 receives the latest data from the Compute GPS Coordinate Segment 130 and the Navigational Data Segment 132 (and the TOD at which each of the data is sent). From very precise positional data, knowledge of which direction the aircraft is travelling, and knowledge of the aircraft characteristics, the adaptive filter (and more particularly the Kalman filter) provides a technique for computing the three dimensional accelerations of the aircraft, and thereby predict future tracking of the aircraft. Of the above data determined by the Kalman Smoothing Filter Segment 136, only the geoposition 37 and the present track data is transmitted in the data package 35 as illustrated in FIG. 4 to other receiving aircraft. Segment 136 also outputs the future tracking of the receiving aircraft 12b to the data combiner 152 of the receiving aircraft.

The use of Kalman filtering is well known for prediction as illustrated in the above listed filter texts by Anderson et al. and Goodwin et al. Coefficients of the Kalman filter are altered to change the probabilistic characteristics of the filter (the coefficients of an airliner will differ considerably from a small aircraft) depending upon the coefficients of the aircraft. The proper coefficients for each aircraft are determined largely based upon known operating characteristics of the aircraft (by using modelling techniques). However, since the Kalman filter is on adaptive filter, the coefficients within the filter will be modified over a very short time period if the actual operating characteristics of any aircraft differs from those that the gain coefficients of the Kalman Filter are set at. In this manner, the Kalman filter obtains accurate probabilistic figures relating to the future track of the aircraft depending upon variations in its positions as determined by GPS data signals, utilizing TOD time separations.

Kalman filters, as with other adaptive probabilistic and possibilistic filters, function to minimize an error between the predicted state at a given time in the future, and the actual state at that given time. If there is some error at the given time, then it can be logically deduced that the gain coefficients of the Kalman filter are not set correctly. The Kalman filter coefficients are thereupon "adapted" using a known technique to produce a smaller error in the future. After this error reducing progression is repeated a plurality of times, the error between the predicted state and the actual state for the given time should be reduced to almost zero. When the gain coefficients are close to zero, then the Kalman filter will very accurately model the future track of the aircraft.

Kalman filters in general, and the Kalman Filter Segments 136 and 154 in particular, assume that the inputs provide stochastic processes; and the desired responses, are jointly stationary. Kalman filters use a state-space approach in which a dynamic system is described by a set of variables called a state. The state contains all the necessary information about the behavior of the system such that, given the present values of the state (position, track) and present-values of the input (the Kalman gain coefficients) that the future values of the state (position and track) may be determined. Applying the Kalman filter results in a set of difference equations, the solution of which can be computed recursively.

The future tracking information derived by the Kalman smoothing filter is provided to only the aircraft which contains this ALIS (i.e., the future tracking information is transferred to data combiner 152, but not to I/O protocol segment 138.)

The Input/Output Protocol Segment 138 provides the header and/or the trailer portion to the present position and present track data contained in the Kalman Smoothing Filter Segment 136, and thereby constructs the data package as illustrated in FIG. 4 which permits transmission from the transmitting aircraft 12a to the receiving aircraft 12b. This data is provided to the Transmitter Segment 140, which transmits the data package over the transmitting antenna 52 illustrated in FIG. 1 using known software and software techniques.

The predicted positional information from the Kalman Smoothing Filter Segment 136 is also applied to the Zone Monitor Segment 142. The Zone Monitor Segment 142 takes the positional data provided by the Segments 130, 132, 134, and 136, and determines which zone the aircraft is presently located in based upon the GPS geoposition (reference character 37 of FIG. 4), as compared to data stored in an on-board computer. Once the aircraft determines which zone it is located within, the proper channel (frequency in FDMA, or code in FDMA) at which the transmitting antenna 99 of FIG. 5 should be operating at is determined (from stored data within a computer located on the transmitting aircraft.) The desired channel is transmitted to the Tune Word Segment 146 via data combiner 144.

The Tune Word Segment 146 functions as a tuner to control the channel of the Transmitter Segment 140, such that the RF amplifier (98 in FIG. 5) is tuned to transmit the signal over the correct channel over antenna 99 of FIG. 5. There is also an input to the Tune Word Segment 146 from a Display Segment 162 which functions as an override, such that the pilot can manually set the channel within the transmitting aircraft as desired or appropriate. If there are other aircraft within the zone which are transmitting over the same channel, then another channel will be selected to limit conflicting data transfers from more than one aircraft.

The receiving portion 122 of FIG. 7 contains a Scanning Receiver Segment 150, a data combiner 152, a Kalman Tracking Filter Segment 154, an I/O Protocol Segment 156, a Prediction Filter Segment 158, a data combiner 160, and the Display (including Keypad) Segment 162.

The Scanning Receiver Segment 150 receives data packages (35 of FIG. 4) transmitted from other aircraft over the receive antennas 52 which is connected to the warning receiver 82 of FIG. 5. The Scanning Receiver Segment 150 receives the geopositional, AIC and present tracking data from other transmitting aircraft. The advantage of this configuration is that each aircraft acts to determine its own position, velocity, and relays this information electronically. The receiving aircraft can thereupon compute future tracking of other aircraft in its vicinity wit their own ALIS. There is no need for redundant positional systems to be located on other aircraft.

The positional data from the Scanning Receiver Segment 150 and the Kalman Smoothing Filter Segment 136 are combined in the data combiner 152 to provide to the receiving aircraft the present position and future tracking of the receiving aircraft, as well as the present position and present tracking information of other transmitting aircraft in the vicinity.

The Kalman tracking filter 154 thereupon determines the probabilistic future tracking of the other aircraft in the vicinity. Tracking Filter Segment 154 receives the positional information as described in the Kalman Smoothing Filter Segment 136, computes similar positional information and future tracking of the other transmitting aircraft, and computes the relative predicted position and future tracking of the receiving aircraft. The advantage of using Kalman filtering in Segments 136 and 154 is their robustness and accuracy in providing probabilistic future tracking positions of the receiving and transmitting aircraft based upon a series of GPS locations as detected by each aircraft as they receive a plurality of GPS signals. The description of Kalman filtering which was provided referring to Segment 136 also pertains to Segment 154. Any adaptive filter may be used in either segment 136 or 154, but the Kalman is the most robust.

The Input/Output Protocol Segment 156 provides the header and/or the tailer portion to the data contained in the Kalman Tracking Filter Segment 154, and thereby combines the positional data relating to the receiving aircraft 12b and each of the transmitting aircraft 12a in such a manner that the relative positions of all of the aircraft can be applied to the display 15 (see FIG. 5) by the Display Segment 162 (FIG. 7). The Display Segment Software is known in the art, and is quite similar in technology to the storm scopes and weather radar which display positional weather phenomenon to aircraft.

The output from the Kalman Tracking Filter 154 is also applied to the Prediction Filter Segment 158. The computer on board the receiving aircraft has a set of rules it follows to determine whether the other transmitting aircraft and the receiving aircraft are likely to be in imminent danger. The rules follow basic Bayesian logic. Such a set of rules would follow an outline similar to: if the transmitting aircraft and the receiving aircraft are within x miles, and their probabilistic future paths intersect within a three dimensional region of airspace of a predetermined maximum size, and both aircraft are predicted to be located within the region within y minutes of each other, issue a warning to the receiving aircraft. The function of the Prediction Filter Segment 158 is to issue a warning to the pilot of the receiving aircraft if any of the transmitting aircraft 12a have a predicted position and/or velocity which present a potential threat to the receiving aircraft 12b. If this is the case, then suitable warnings are provided on the display 15 of FIG. 2, such as flashing icons of the offending aircraft and/or a suitable warning indication on the warning panel 18.

Probabalistic Future Volume Intersection

Figure 9:
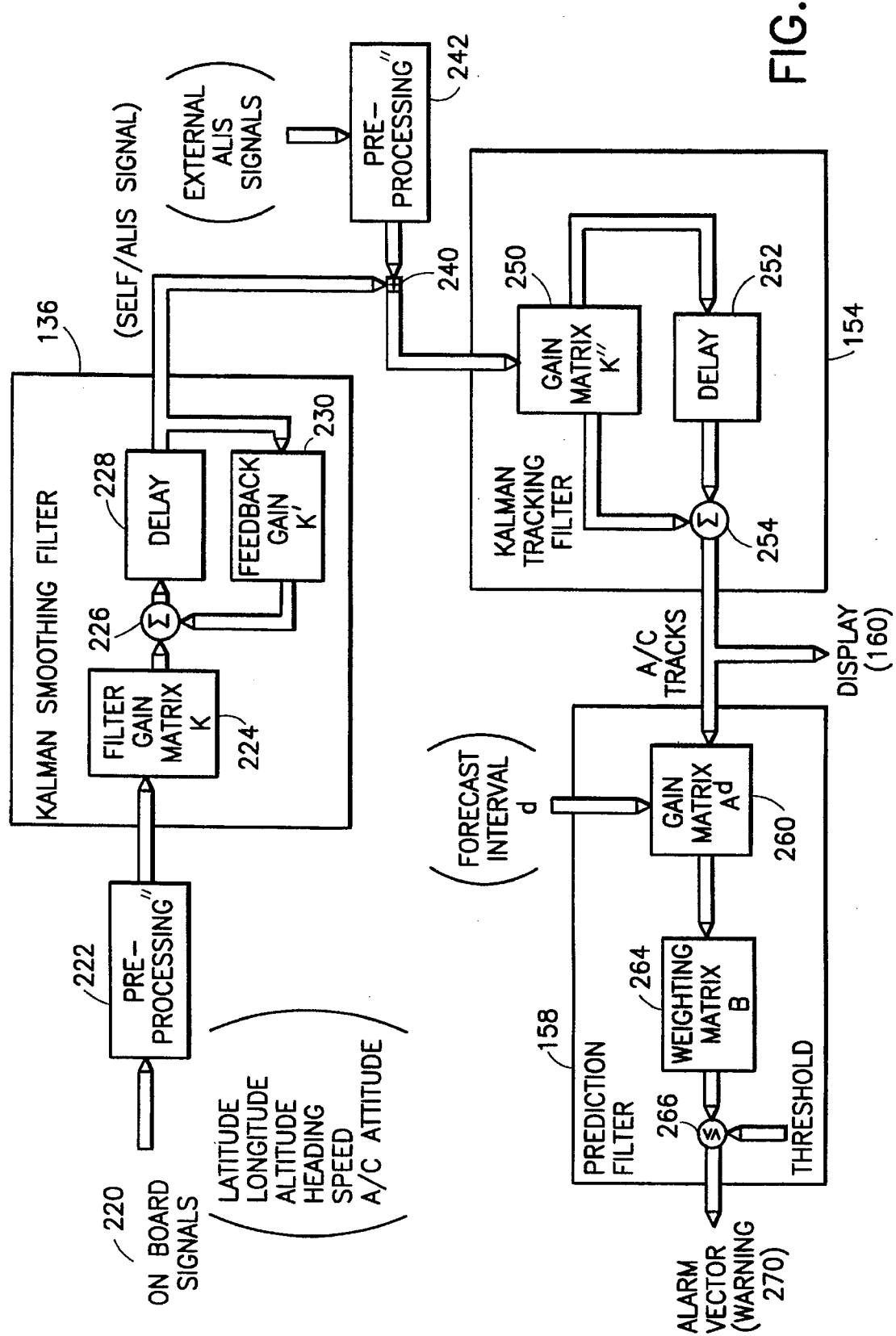
FIG. 9 illustrates a schematic diagram of the elements of ALIS of the present invention which one receiving aircraft would utilize in determining whether there will be a intersection of the probabilistic or possibilistic volumes of the receiving aircraft and at least one transmitting aircraft in the near future.

The purpose of this portion is to provide an example of how the ALIS is utilized to-determine a probabilistic future intersection between two aircraft. The elements of the ALIS are identical to those previously illustrated and described in FIGS. 5 and 7, but are repositioned somewhat as illustrated in FIG. 9 to illustrate how an AILS system aboard a receiving aircraft would function to determine probabilistic future intersections.

An onboard signal for segment 220 (which comprises the information provided by the compute GPS coordinate segment 130 and data segment 132 of FIG. 7) provides the latitude, longitude, altitude, heading, speed, as well as the aircraft altitude of the receiving aircraft to the receiving aircraft. Certain of the above parameters are provided in GPS format. Therefore, a preprocessing segment 222 translates the data from the GPS (spherical) format to a more readily used x,y,z coordinate axis which has the receiving aircraft at its origin, and is aligned therewith.

The output from the preprocessing segment 22 is input into the smoothing filter segment 136 (as described in FIG. 7). The Kalman smoothing filter segment includes a filter gain matrix 224, a summer 226, a delay element 228 and feedback gain matrix 230 as configured as illustrated in FIG. 9. The Kalman smoothing filter segment functions are well known in the art to produce a probabilistic indication of where the receiving aircraft is likely to be located in the future (within a probabilistic volume defined by the above x, y, and z coordinates) at certain desired times (in 5, 10, or 30 seconds in the future, for example). Since the onboard signal 220 has eight inputs (the aircraft attitude segment being formed from roll, bank, and yaw), in order for the Kalman smoothing filter segment to function, there must be 8 coefficients defined within the gain matrix portion 224. Outputs from the Kalman smoothing filter segment 136 are applied to a merge element 240.

The data packets 35 of FIG. 4 are applied from a preprocessing section 242 to the merge section 240. The preprocessing section 242 takes the present geolocation and tracking data transmitted via the data packages, and translates into the above x, y, z coordinate system. The coordinate system is oriented relative to the receiving aircraft, so that the data being received via the data packets can be applied more readily to the receiving aircraft 12b. Therefore, the input to the merge element 240 contains a data signal comprising receiving aircraft present and future tracking, as well as present positional information; as well as each of the transmitting aircraft's past and present tracking data, as well as present positional information. All of this information is input into the Kalman tracking filter segment 154.

The function of the Kalman tracking filter segment 154 is to provide all the future tracking information of the receiving and transmitting aircraft. The Kalman tracking filter segment is formed of a gain matrix portion 250, a delay portion 252 and a summation element 254. The Kalman tracking filter 154, as described above, utilizes known technology to produce a probabilistic future state of the aircraft (which can be defined within a volume). Once again, since each aircraft has, by example, eight elements which can effect its tracking, the Kalman tracking filter segment must have at least eight gain elements, which apply to the coefficients of the difference equation utilized by the common tracking filter segment. The output of the Kalman tracking filter segment 154 is a set of projected probabilistic volumes of certain probability, with the locations of each defined in the x, y, z coordinate system.

The method of the Kalman tracking filter segment 154 is applied to the prediction filter segment 158 as well as the display 160. The display 160 has already been described above.

The prediction filter segment 158 includes a forecast interval segment 262, a gain matrix portion 260, a weighing matrix 264, a threshold 265 and a comparator 266. The function of the forecast interval portion 262 and the gain matrix portion 260 is to limit the time which the projected future volume of the receiving and transmitting aircraft are considered for intersections. For example, the forecast interval for aircraft operating nearby crowded airspace may be relatively small, (perhaps 20 seconds) while the forecast interval for aircraft travelling in airspace located far away from other aircraft may be increased (perhaps a minute or more). It is possible the forecast interval may be set by the pilot depending on personal knowledge and skill, or the forecast interval 262 may be automatically set in considering the zone monitor segment 142 of FIG. 7 (this parameter may also be stored in a computer aboard the aircraft). Once the forecast interval is set and input into the gain matrix 260, then the gain matrix applies the output data from the Kalman tracking filter 154, which applies within whatever future periods are within the forecast interval. These future predicted volumes are output from the gain matrix 260 into the weighing matrix 264.

The weighing matrix 264 considers the projected future probalistic volumes within the forecast interval, which are transmitted from the gain matrix 260, relating to the receiving aircraft and one or more transmitting aircraft, and applies its rule-based logic to determine the probability of intersection between the receiving aircraft 12b and at least one of the transmitting aircraft 12a. The rules of the weighing matrix segment 264 may utilize Bayesian logic, which is well known in the art, to consider the probability of intersection of the probabalistic future volumes. The output of the weighing matrix 264 will be the maximum probability of intersection at any one time, between the receiving aircraft, and each of the transmitting aircraft. This probability of intersection is applied to the comparators 266, which also has an input from the threshold 265. Therefore, if the probability of intersection with any of the receiving aircraft becomes too large (exceeds the predetermined threshold), then an alarm vector 270 will be provided which will indicate a suitable warning on the warning segment 18 of the display 15 of FIG. 2. The probabilistic logic can be modified if there is some known condition which will likely affect the future path of either aircraft (i.e. the aircraft is lining up with a runway, etc.).

Potential Applications

The primary application for the ALIS concept is to limit the possibility of aircraft collisions. This function can be performed continuously during flight for both commercial, private, and military aircraft. An ancillary benefit is that an airport ATC system can use the ALIS to independently locate and identify approaching, departing, or transient aircraft of either type. This function is particularly useful in the high traffic areas surrounding major airports. Furthermore, the tower can use ALIS to locate and identify taxiing aircraft on the runway by other than visual means. This eliminates problems that arise due to physical obstructions or inclement weather.

ALIS can also provide civilian and military functions that are not currently available. In particular, in applications involving Unmanned Aerial Vehicles (hereafter referred to as UAV), ALIS can provide a means for achieving a formation of such vehicles. The FAA has limited the use of such aircraft to certain areas at limited times, i.e. military operating areas, to limit potential conflict with manned aircraft. If there was some system which would be capable of providing an accurate continual indication of the UAVs position as well as its likely future trajectory, this would be beneficial in providing acceptance of UAVs in other less limited applications. There are certain applications which UAVs are superior to manned vehicles.

There would be two modes of operation for ALIS aboard UAVs. The first mode would be to make the UAV function as a transmitting aircraft 12a. If the UAVs are functioning as only a transmitting aircraft, then the portions of the ALIS which functions as a receiver could be eliminated. In this mode, the ALIS is simply functioning to make other receiving aircraft which are located in the vicinity of the UAV aware of the position and presence of the UAV. The transmitting portion of the ALIS is identical to the manned versions of the transmitting aircraft.

The second mode of operation for ALIS aboard UAVs would require the UAV to function as both a receiving aircraft and a transmitting aircraft. In this mode, the transmitting portion of the ALIS is identical to the manned transmitting aircraft, and is also identical to the UAVs operating under the first mode. The receiving portion ALIS aboard UAVs which are functioning under the second mode (both transmitting and receiving ALIS) require override software in their control package such that if the UAV becomes too close to another aircraft, the path of the UAV will be altered. Alternately, if the UAV is functioning under control from a pilot based on the ground, the ground based pilot would become aware of any potential collision between the UAV and a second aircraft based upon a ground based ALIS display. Once again, providing potential future path of the transmitting and receiving aircraft provides earlier collision detection than the prior art present path collision detection; the process of collision avoidance more becomes more reliable whether one is dealing with a UAV or a manned aircraft.

Another potential UAV function is to use ALIS to provide IFF capability to aircraft in the vicinity of the UAV to prevent cases of mistaken identity from occurring. This is of particular importance in military operations.

While the invention has been particularly shown and described with respect to preferred embodiments thereof, it will be understood by those skilled in the art that changes in form and details may be made therein without departing from the scope and spirit of the invention.

What is claimed is:

1. An aircraft location and identification system, for determining probabilistic future tracking information for aircraft comprising:

A transmitting aircraft, a receiving aircraft, first position determining means employing earth coordinate position data located aboard said transmitting aircraft for determining a first set of present positional and tracking information described in electronic format, relating to the position of said transmitting aircraft relative to earth coordinates;

transmitting means aboard said transmitting aircraft and connected to said first position determining means aboard said transmitting aircraft for the non-interrogating, non-redundant differential, phase-shift keyed transmission of said first set of present positional and tracking information by frequency division multiplexing on a unique assigned carrier frequency channel to said receiving aircraft;

second position determining means located aboard said receiving aircraft for determining a second set of present positional and tracking information described in electronic format, relating to said receiving aircraft; and computing means located aboard said receiving aircraft including storage means for storing present values and past values of said first set of positional and tracking information transmitted from said transmitting aircraft, and for storing present values and past values of said second set of positional and tracking information relating to said receiving aircraft, said computing means further including processing means for utilizing said past and present values of said first set of positional and tracking information from said storage means to compute corresponding first probabilistic future tracking path information for said transmitting aircraft and for utilizing said past and present values of said second set of positional and tracking information to compute corresponding second probabilistic future tracking path information for said receiving aircraft, said computing means further including intersection means for determining whether the first probabilistic future tracking configuration will intersect the second probabilistic future tracking configuration in the future, prediction means for determining a maximum probability of intersection between the first probabilistic future tracking configuration and the second probabilistic future tracking configuration, threshold means for determining whether said maximum probability of intersection exceeds a predetermined threshold, warning means for providing a warning if said maximum probability of intersection exceeds a predetermined threshold, and wherein said transmitting means transmits said positional and tracking information in a non-redundant, unique selected one of CDMA and FDMA transmission coding.

2. The aircraft location and identification system as described in claim 1, wherein said position determining means for determining present positional and tracking information employs the velocity and the present altitude and the geolocations of said aircraft relative to earth coordinates.

3. The aircraft location and identification system as described in claim 1, wherein said probabilistic future tracking path information computed by said processing means comprises:

a probabilistic volume which defines, within a given probability, where an aircraft will be located at a predetermined time in the future.

4. The aircraft location and identification system as described in claim 1, wherein said computing means further includes prediction means for utilizing said first and second probabilistic future tracking path information for computing the probability of interference of said receiving aircraft with said transmitting aircraft.

5. The aircraft location and identification system as described in claim 1, wherein said first and second position determining means utilizes an inertial navigation unit/system.

6. The aircraft location and identification system as described in claim 1, wherein said first and second position determining means utilizes a plurality of GPS satellites and wherein said positional information describes position of the transmitting aircraft above the earth plus the altitude of the transmitting aircraft.

7. The aircraft location and identification system as described in claim 1, wherein said transmitting means utilizes:

a data package which contains the first present positional and tracking information in digital format and a time of day portion consisting of non-timing information for temporal currency.

8. The aircraft location and identification system as described in claim 1, wherein said transmitting means is a non-interrogatory device.

9. The aircraft location and identification system as described in claim 1, wherein said system utilizes a plurality of zones defined about the earth, wherein each of the zones has a distinct set of channels associated therewith, and wherein said system further comprises:

zone monitor means located aboard the transmitting aircraft, for detecting which zone a transmitting aircraft is located within and channel selection mean for selecting a specific channel for the transmitting aircraft to transmit over depending upon which zone the transmitting aircraft is presently located within.

10. The aircraft location and identification system as described in claim 1, further comprising:

ground based facility means for receiving signals from the transmitting means from each transmitting aircraft, thereby determining the relative position and headings of each transmitting aircraft.

11. An aircraft location and identification system, comprising:

a transmitting aircraft, a receiving ground based facility, first position determining means employing earth coordinates located aboard said transmitting aircraft for determining a set of present positional and tracking information described in electronic format, relating to said transmitting aircraft, differential, phase-shift keyed transmitting means connected to said first position determining means aboard said transmitting aircraft for transmitting said set of present positional and tracking information to said receiving ground based station by frequency division multiplexing on a unique assigned carrier frequency channel; and computing means located at said receiving ground based facility including storage means for storing present and past positioned and tracking information transmitted from said transmitting aircraft, said computing means further including processing means which utilizes said present and past values of the first set of present positional and tracking information to derive corresponding probabilistic future tracking path information of the said transmitting aircraft.

12. A method for providing a relative location of a transmitting aircraft to a receiving aircraft, comprising the steps of:

determining within said transmitting aircraft a first set of present position and tracking information of the transmitting aircraft;

transmitting by frequency division, phase-shift keying the first set of present position and tracking information from the transmitting aircraft to the receiving aircraft by frequency division multiplexing in a unique, non-interrogating non-redundant carrier transmission mode;

determining a second set of present position and tracking information of the receiving aircraft; and computing aboard said receiving aircraft, based upon at least two of said first set of present position and tracking information, a first corresponding probabilistic future tracking configuration of said transmitting aircraft; and based upon at least two of said second set of present position and tracking information sets, a second corresponding probabilistic future tracking configuration of said receiving aircraft, providing aboard the receiving aircraft, the first and second corresponding probabilistic future tracking configuration, determining whether the first probabilistic future tracking configuration will intersect the second probabilistic future tracking configuration at any given time in the future, computing a maximum probability of intersection between the first probabilistic future tracking configuration and the second probabilistic future tracking configuration for any given time, determining whether said maximum probability of intersection exceeds a predetermined threshold, providing a warning if said maximum probability of intersection exceeds a predetermined threshold, and transferring data packets between said transmitting aircraft and said receiving aircraft.

13. The method as described in claim 12, wherein said corresponding probabilistic future tracking configuration is computed utilizing a Kalman filter.

14. The method as described in claim 12, further comprising the steps of:

determining which of a plurality of zones the transmitting aircraft is located within; and selecting a channel which is transmitting the position and future probabilistic tracking from the transmitting aircraft to the receiving aircraft.

15. A method for providing a location of an aircraft to a ground station, comprising the steps of:

determining within said aircraft a set of present position and tracking information of the aircraft in a unique, non-interrogating, non-redundant frequency division multiplexing transmission mode;

transmitting by frequency division, phase shift keying the set of present position and tracking information from the aircraft to the ground station;

computing at said ground station, based upon at least two of said sets of present position and tracking information, a corresponding probabilistic future tracking configuration of said aircraft, providing aboard the ground station, the corresponding probabilistic future tracking configuration of the aircraft, determining whether a plurality of probabilistic future tracking configurations of more than one aircraft will intersect at any given time in the future, computing a maximum probability of intersection between the plurality of probabilistic future tracking configurations for any given time, determining whether said maximum probability of intersection exceeds a predetermined threshold, and providing a warning if said maximum probability of intersection exceeds a predetermined threshold.

\* \* \* \* \*